United States Patent [19]

Inubushi et al.

[11] Patent Number: 5,153,080
[45] Date of Patent: Oct. 6, 1992

[54] ALL SOLIDSTATE SECONDARY BATTERY

[75] Inventors: Akiyoshi Inubushi; Toshifumi Nakacho; Yuji Tada, all of Tokushima, Japan

[73] Assignee: Otsuka Kagaku Kabushiki Kaisha, Osaka, Japan

[21] Appl. No.: 555,477

[22] PCT Filed: Dec. 14, 1990

[86] PCT No.: PCT/JP89/01252
§ 371 Date: Aug. 15, 1990
§ 102(e) Date: Aug. 15, 1990

[87] PCT Pub. No.: WO90/07198
PCT Pub. Date: Jun. 28, 1990

[30] Foreign Application Priority Data

Dec. 16, 1988 [JP] Japan .................. 63-319234
Dec. 16, 1988 [JP] Japan .................. 63-319235
Feb. 6, 1989 [JP] Japan .................. 1-28317

[51] Int. Cl.⁵ ............................ H01M 10/40
[52] U.S. Cl. ..................... 429/192; 429/218
[58] Field of Search ................. 429/192, 218

[56] References Cited

U.S. PATENT DOCUMENTS 4,840,856 6/1989 Nakacho et al. ............. 429/192

FOREIGN PATENT DOCUMENTS 61-091868 5/1986 Japan .
62-274555 11/1987 Japan .

Primary Examiner—Stephen Kalafut
Attorney, Agent, or Firm—Armstrong & Kubovcik

[57] ABSTRACT

An all solidstate secondary battery comprising an oxide of layer structure represented by the formula $$(V_2O_5)_x \cdot (A)_y \cdot zH_2O$$

serving as a cathode active material, lithim or a lithium alloy serving as a negative electrode active substance, and an oligoalkyleneoxypolyphosphazene polymer serving as an electrolyte, contains no solvent, is excellent in charge-discharge characteristics and usable with safety over a wide temperature range of from low to high temperatures.

1 Claim, 1 Drawing Sheet

ALL SOLIDSTATE SECONDARY BATTERY

TECHNICAL FIELD

The present invention relates to novel all solidstate secondary batteries, and more particularly to secondary batteries having excellent charge-discharge characteristics, containing no solvent and usable with safety over a wide temperature range of from low to high temperatures.

BACKGROUND ART

In recent years, lithium batteries are in wide use as batteries of high energy density and high voltage. These batteries comprise a positive electrode of manganese dioxide or graphite fluoride, and a negative electrode of lithium and afford a high voltage of at least 3 V. However, they are primary batteries and are not chargeable.

On the other hand, lithium secondary batteries which can be charged are dischargeable many times at a high energy density and high voltage and therefore have many advantages. Although active research has been made on such batteries in many fields, those which are fully serviceable still remain to be developed. For the secondary batteries under development, transition metal chalcogen compounds such as $MoS_2$ and $TiS_2$, and oxides such as $MnO_2$, $Cr_3O_8$ and $V_2O_5$ are used as positive electrode active substances, and lithium, lithium-aluminum alloy, etc. as negative electrode active substances. For use in such batteries, electrolytic solutions are proposed which are prepared by dissolving an electrolyte such as $LiClO_4$ or $LiBF_4$ in propylene carbonate, 1,2-dimethoxyethane or like aprotic organic solvent. The secondary batteries heretofore developed are still unsatisfactory because of the following problems.

The first of the problems is attributable to the organic solvents used for electrolytic solutions. Many of the aprotic solvents widely used at present are low in boiling point and inflammable, are liable to stain neighboring parts and cause ignition or inflammation due to spillage or a break and have a likelihood of explosion due to an error in use or overcurrent. Further repeated discharge and charge electrolytically form on the negative electrode a dendritic deposit of metallic lithium, which gradually grows to eventually cause short-circuiting on reaching the positive electrode.

The second problem arises from the use of the chalcogen compound, oxide or like crystalline substance as the positive electrode substance. Generally with crystalline substances, penetration of Li ions into the crystal lattice due to discharge collapses the crystal structure, rendering the substance unable to retain the original characteristics as crystals. This phenomenon occurs especially markedly in the case of deep discharge involving penetration of a large quantity of Li ions, such that if deep discharge is repeated several times, the battery becomes unserviceable owing to a great decrease in its capacity.

To solve the first of these problems, Sequlir et al. disclose a novel battery comprising a thin film of solvent-free polymer electrolyte (Extended Abstracts, 163rd Meeting, Electrochemical Society, 1983, 83, 751 Abstract, No. 493). The literature, however, merely mentions that the electrolyte is found usable at a medium temperature of about 100° C. when tested, indicating that it is not usable at room temperature. P. M. Blonsky et al. further state that polyphosphazene is useful as an electrolyte for use in electrochemical batteries (J. Am. Chem. Soc., 106, 6854, 1984). Nevertheless, they merely show data as to a.c. conductivity in the range of 30° C. to 97° C. and fail to realize charge and discharge with d.c.

To overcome the second problem, JP-A-116758/1986 proposes the use as the positive electrode active substance of an amorphous substance prepared by adding $P_2O_5$ to $V_2O_5$ and melting and quenching the mixture. However, the battery thus proposed is not completely free of the second problem, with the first problem still remaining unsolved.

Japanese Patent Application No. 1028/1987 discloses a battery wherein an oligoethyleneoxypolyphosphazene is used as the electrolyte and a layer of $V_2O_5$ as the positive electrode active substance to overcome the first and second problems, whereas the disclosed battery has yet to be improved in resistance to excessive discharging and in charge-discharge characteristics.

An object of the present invention is to provide an all solidstate secondary battery substantially free of formation of dendrite and spillage, having no ignitability because of the features of flame retardancy and low vapor pressure, excellent in safety against explosion, rupture or the like and also in resistance to excessive discharging and having a prolonged charge-discharge cycle life.

DISCLOSURE OF THE INVENTION

The present invention provides an all solidstate secondary battery comprising an oxide of layer structure represented by the formula

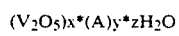

wherein $x+y=1$, $0<y\leq 0.5$, z is 0.1 to 1.6, and A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$, the oxide of the formula serving as a positive electrode active substance, lithium or a lithium alloy serving as a negative electrode active substance, and at least one of the substances (a) to (c) given below serving as an electrolyte.

(a) Oligoalkyleneoxypolyphosphazenes having a fluoroalkylsulfone group comprising segments of the following formulae (I), (II) and (III) in an optional arrangement

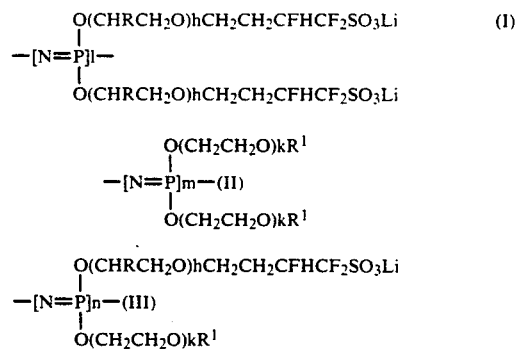

wherein R is hydrogen or methyl, $R^1$ is methyl, ethyl or propyl, h and k each mean the average number of repeating alkyleneoxy units and are a real value in the respective ranges of $0\leq h\leq 18$ and $0\leq k\leq 20$, l, m and n are each an integer and are in the range of $3\leq l+m+n\leq 200000$, and $l+n\neq 0$.

(b) Complex compounds of a lithium salt and an oligoalkyleneoxypolyphosphazene having allyl groups and comprising segments of the following formulae (IV), (V) and (VI) in an optional arrangement $$-[N=P]_p- \begin{array}{c} O(CHRCH_2O)iCH_2CH=CH_2 \\ | \\ | \\ O(CHRCH_2O)iCH_2CH=CH_2 \end{array} \quad (IV)$$

$$-[N=P]_q- \begin{array}{c} O(CH_2CH_2O)jR^2 \\ | \\ | \\ O(CH_2CH_2O)jR^2 \end{array} \quad (V)$$

$$-[N=P]_r \begin{array}{c} O(CHRCH_2O)iCH_2CH=CH_2 \\ | \\ | \\ O(CHRCH_2O)jR^2 \end{array} \quad (VI)$$

wherein R is hydrogen or methyl, $R^2$ is one or a mixture of at least two of methyl, ethyl and propyl, i and j each mean the average number of repeating alkyleneoxy units and are a real value in the respective ranges of $0 \leq i \leq 15$ and $0 \leq j \leq 15$, p, q and r are 0 or a positive integer provided that $3 \leq p+q+r \leq 200000$, and $r \neq 0$.

(c) Solutions of a lithium salt in a polymer represented by the following formula (VII)

$$-[N=P]_v- \begin{array}{c} O-(CHRCH_2O)u-CH_3 \\ | \\ | \\ O-(CHRCH_2O)u-CH_3 \end{array} \quad (VII)$$

wherein R is hydrogen or methyl, u means the average number of repeating alkyleneoxy units and is a real value of 1 to 20, and v means the average number of repetitions and is a real value in the range of $3 \leq v \leq 200000$.

The positive electrode active substance (cathode active material) to be used in the present invention is an oxide layer structure represented by the formula $$(V_2O_5)x*(A)y*zH_2O$$

wherein $x+y=1$, $0<y<0.5$, z is 0.1 to 1.6, and A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$. The ratio of the oxide A to $V_2O_5$ is up to 0.5, preferably 0.001 to 0.3. If the $V_2O_5$ is present singly, insufficient resistance to excessive discharging will result, whereas ratios exceeding 0.5 lead to a lower discharge capacity and are therefore undesirable. Although the reason still remains to be fully clarified why the oxide of layer structure prepared by adding to $V_2O_5$ other oxide has excellent resistance to excessive discharging, the high resistance appears attributable to the presence of the oxide added which serves as a kind of anchor for the oxide of layer structure having a loose bond to reinforce the layer structure. For this reason, the above effect is available even if the oxide is added in a very small amount. If z is less than 0.1, the oxide of layer structure becomes crystallized, whereas if it is over 1.6, an excess of water reacts with Li to impair the characteristics of the battery. Thus, z values outside the above range are not desirable. The term the "oxide in the form of a layer (or of layer structure)" as used herein referes to an oxide which is in the form of a layer parallel to a flat substrate and exhibits the X-ray diffraction shown in FIG. 1 when made into a film on the substrate by the method to be described below.

The oxide of layer structure can be prepared by a usual method. First, an aqueous oxide solution is prepared from $V_2O_5$ and the oxide to be added thereto, by mixing together these oxides in a predetermined ratio, melting the mixture, bringing the melt into contact with a cooled steel plate or copper roll for quenching, and dissolving the resulting mixture in water. The melt may be directly placed into water for quenching to thereby prepare the aqueous solution. Alternatively, depending on the type of oxide to be added, it is possible to similarly dissolve $V_2O_5$ only in water and thereafter dissolve the other oxide directly into the solution or add the oxide as dissolved in water to the solution. Further alternatively, the aqueous solution can be prepared by mixing together an alkoxide $VO(OR)_3$ of $V_2O_5$ and an alkoxide of the other oxide in a predetermined ratio and thereafter hydrolyzing the mixture. It is also possible to treat an aqueous solution of ammonium vanadate or the like with an ion exchange resin to remove the ammonium ions. The desired oxide of layer structure can be obtained by drying the aqueous oxide solution thus prepared. The aqueous solution can be dried by various methods according to the contemplated purpose, for example, by spray-drying to obtain a powder or by spin coating to form a thin film. A positive electrode can therefore be prepared with use of the oxide of layer structure by coating an electrically conductive substrate of nickel, stainless steel or the like directly with the aqueous solution and drying the coating to form a film, or by admixing an electically conductive powder of acetylene black, Ketjenblack, graphite or the like with the oxide powder to give conductivity thereto, further admixing a finely divided binder as of polytetrafluoroethylene, polyethylene or polystyrene with the mixture as required, kneading the resulting mixture, and shaping the mixture into pellets or a sheet of a specified thickness as deposites on netting or the like of stainless steel, nickel or the like.

At this time, a suitable amount of electrolyte for use in the invention may be admixed in place of or along with the binder, followed by shaping similarly. Alternatively, a suitable amount of such an electrolyte is dissolved in the aqueous solution of oxide of layer structure, and the resulting solution is dried and formed into a film or is made into a dry powder so as to be mixed with the conductive powder. These methods are useful for promoting the conduction of lithium ions to give a battery of reduced internal resistance.

On the other hand, the negative electrode active substance to be used in the present invention is lithium or a lithium alloy. For use as a negative electrode, the substance is made into a sheet, and an electrically conductive net of nickel, stainless steel or the like is clad with the sheet.

The polymers represented by the formulae (I) to (VII) consist essentially of a polyphosphazene wherein an inorganic high polymer skeleton having the main chain of phosphonitrile with excellent flexibility and low-temperature characteristics is provided with oligoalkyleneoxy side chains having high affinity for ions, so that the polymer exhibits high conductivity through the transfer of lithium ions only. These polymers have a high molecular weight and are suitable for overcoming the foregoing problems of lithium secondary batteries along with the high conductivity of lithium ions.

The phosphazene polymer (a) can be obtained as a rubberlike product, for example by reacting the lithium salt of an oligoalkyleneoxytrifluorobutylsulfonic acid and an alcoholate of oligoethyleneoxy monoalkyl ether with dichlorophosphonitrile polymer in a solvent, followed by desalting and purification.

When the phosphazene polymer is to be used as an electrolyte, the polymer can be easily made into a film by dissolving the polymer in an ether solvent such as dimethoxyethane or tetrahydrofuran. Accordingly, it is convenient to form the film by applying the polymer solution to the negative electrode or positive electrode and removing the solvent from the coating, or to form the film first and interpose the film between the positive electrode and the negative electrode.

The polymer for use in the compound (b) is one wherein an inorganic high polymer skeleton having the main chain of phosphonitrile is provided with oligoalkyleneoxy groups and allyl groups. This polymer is soft, soluble in water and capable of dissolving some salts therein. The side chain having an allyl group introduced therein at its terminal end can be crosslinked at the terminal end, permitting the polymer to exhibit excellent shape retentivity when made into a film without losing the characteristics of the skeleton and side chains.

The oligoalkyleneoxypolyphosphazene having allyl groups can be prepared, for example, by preparing an oligoalkylene glycol monoalkyl ether and an alkali metal alcoholate of oligoalkylene glycol monoallyl ether, and reacting predetermined amounts of the ether and the alcoholate with dichlorophosphonitrile polymer obtained by subjecting hexachlorotriphosphonitrile to ring-opening polymerization. The reaction can be conducted by mixing the reactants together at a temperature of up to about 40° C. with use of a usual organic solvent such as tetrahydrofuran (THF) or diglyme and subsequently refluxing the mixture with heating for several hours. The alkali metal to be used is suitably sodium, lithium or the like.

The polymer can be used as an electrolyte in the form of a film which is prepared from a uniform solution obtained by adding a solvent solution of a lithium salt to a solution of the polymer in a solvent such as one given below. Depending on the contemplated purpose of use, the solution to be formed into the film or the film obtained may be rendered complex by heating, ultrasonic or ultraviolet irradiation or like treatment. Examples of useful solvents are THF, dioxane, dimethoxyethane and like ethers, acetone, methyl ethyl ketone (MEK) and like ketones, methanol, ethanol and like alcohols, acetonitrile, propylene carbonate, etc.

It appears that the allyl groups present in the molecule of the polymer in the compound (b) for use in the invention act effectively in connection with the complex product forming treatment. More specifically, it is thought that the polymer is made into and retained in a form which is favorable for use as the battery electrode by coupling between the allyl groups and a reaction or interaction between the allyl group and the added salt.

The preferred lithium salt for use in the compound (b) of the invention is at least one of $LiClO_4$, $LiAlCl_4$, $LiBF_4$, $LiCl$, $LiPF_6$, $LiAsF_6$, $CF_3SO_3Li$, etc.

In the case of the polymer for use in the solution (c), u means the average number of repeating alkyleneoxy units and is 1 to 20, preferably 5 to 12. High lithium ion conduction can be obtained by suitably selecting the u value. Further v is a real value in the range of $3 \leq v \leq 200000$. The flowability and mechanical properties of the polymer is adjustable by selecting the v value, so that the polymer to be used can be given the characteristics desirable for the contemplated purpose. The polymer can be prepared, for example, by preparing a sodium alcoholate of oligoalkylene glycol monoalkyl ether and reacting a predetermined amount of the alcoholate with dichlorophosphonitrile polymer obtained by subjecting hexachlorotriphosphonitrile to ring-opening polymerization. The reaction can be carried out by mixing the components together at a temperature of up to about 40° C. with use of a usual organic solvent such as tetrahydrofuran or diglyme and subsequently refluxing the mixture with heating for several hours. For use as an electrolyte, the polymer can be in the form of a film which is prepared from a uniform solution obtained by adding a solvent solution of a lithium salt to a solution of the polymer in a solvent such as tetrahydrofuran, dioxane, dimethoxyethane or like ether, acetone, methyl ethyl ketone or like ketone, methanol, ethanol or like alcohol, acetonitrile, propylene carbonate or the like.

The preferred lithium salt to be used in the solution (c) is at least one salt selected from among $LiClO_4$, $LiAlCl_4$, $LiBF_4$, $LiCl$, $LiPF_6$, $LiAsF_6$, $CF_3SO_3Li$, etc.

The battery of the invention is fabricated, for example, by coating a specified stainless steel plate with an aqueous solution of the oxide of layer structure, drying the solution, applying to the coating a solution of the polymer electrolyte prepared in advance, removing the solvent from the resulting coating to form a film, placing over the film a lithium-coated stainless steel plate prepared separately in an inert gas atmosphere, and vacuum-sealing the assembly with use of a sealant. When required for the construction of the battery, a separator film formed with minute pores and impregnated with the electrolyte is also usable.

Generally, the characteristics of batteries can not be determined only from the characteristics of each single component thereof, and the battery capacity and charge-discharge characteristics are especially totally beyond anticipation. Needless to say, the fact that the all solidstate secondary battery of the present invention is free of the foregoing problems of secondary batteries and exhibits excellent performance is attributable solely to the combination of the components thereof described above. FIG. 2 shows an embodiment of all solidstate secondary battery of the invention, which is an example of battery of the sheet type. The invention is applicable not only to batteries of this type but also to batteries of the button type or cylinder type.

Indicated at 1 is a film of oxide of layer structure, at 2 metallic lithium, at 3 a film of electrolyte, at 4 stainless steel foil, and at 5 a sealant.

BEST MODE OF CARRYING OUT THE INVENTION

The present invention will be described in greater detail with reference to the following examples. The batteries to be described below were all fabricated in an argon atmosphere.

EXAMPLE 1

(1) Preparation of Positive Electrodes

A predetermined amount of specified oxide was admixed with $V_2O_5$, and the mixture was then heated in a platinum nozzle and melted. The melt was forced out onto a copper rotor rotating at a high speed and thereby quenched to obtain a ribbonlike amorphous product, which was thereafter dissolved in water. The solution was uniformly applied to stainless steel foil, measuring 5.5 cm×9 cm and 20 μm in thickness, over the central portion thereof with an area of 36 $cm^2$ and then dried at about 80° C. to form a film. The coated foil was thereafter dried at 180° C. for 5 hours to obtain a positive electrode. The same procedure as above was repeated using different oxides. The oxides of the formula $(V_2O_5)x.A)y.zH_2O$ used were all 0.3 in the z value.

For comparison, a sheet was prepared from a mixture of finely divided crystalline $V_2O_5$, conductive agent of acetylene black and forming agent of polytetrafluoroethylene in the ratio of 70:25:5, and a piece of 4.5 cm×8 cm was cut out from the sheet and placed on stainless steel foil for use in Comparative Example 1.

(2) Preparation of Negative Electrodes

Piece of stainless steel foil, measuring 5.5 cm×9 cm and 20 μm in thickness, were each centrally clad with a piece of lithium foil weighing 40 mg for use as negative electrodes.

(3) Preparation of Electrolyte

A dimethoxyethane solution of phosphazene polymer about 1,700,000 in average molecular weight and represented by $[NP\{O(CH_2CH_2O)_7CH_2CH_2CFHCF_2SO_3Li\}_{0.29}\{O(CH_2CH_2O)_7CH_3\}_{1.71}]n$ was prepared.

For comparison, $LiClO_4$ was dissolved to a concentration of 1 mole/liter in a mixture of equal quantities of propylene carbonate and 1,2-dimethoxyethane, and a nonwoven fabric of polypropylene was impregnated with the solution for use in Comparative Example 2.

(4) Fabrication of Battery

Figure 1:
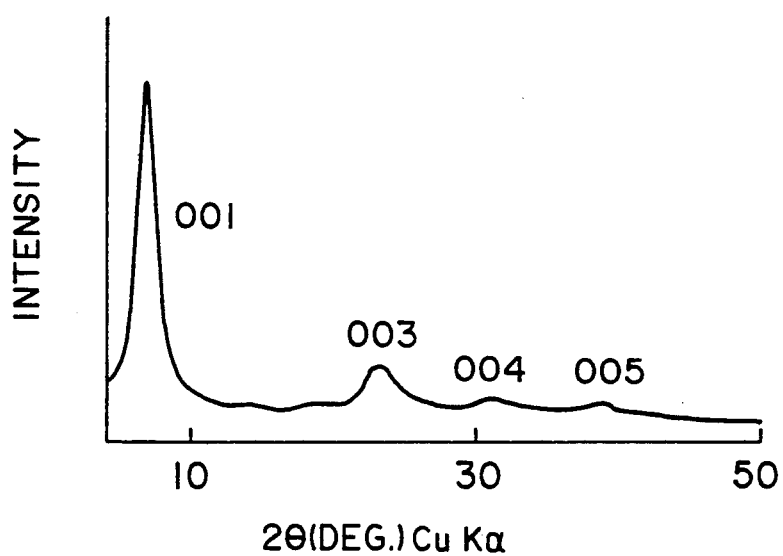
FIG. 1 shows an example of X-ray diffraction pattern of an oxide of layer structure prepared in the form of a film on a flat substrate for use in the present invention.
Figure 2:
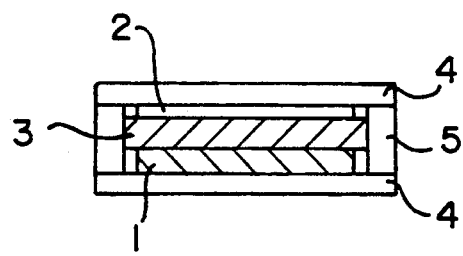
FIG. 2 is a schematic view in section showing a sheet-type battery embodying the invention.

FIG. 2 is a schematic view in section showing a sheet-type battery embodying the invention. The battery externally measures 5.5 cm×9 cm in conformity with the size of visiting cards and has thickness of about 0.2 mm. In the drawing, indicated at 1 is a film of oxide of layer structure, at 2 metallic lithium, at 3 a film of electrolyte, at 4 stainless steel foil, and at 5 a sealant. For the fabrication of batteries, a film of electrolyte was formed by applying the phosphazene polymer solution to each positive electrode and removing the dimethoxyethane. Subsequently, the negative electrode with a sealant applied thereto over a width of about 5 mm along its periphery was affixed to the positive electrode, as vacuum-sealed to complete the battery.

(5) Measurement of Charge-Discharge Characteristics of Batteries

Each of the batteries thus fabricated was subjected to charge-discharge cycles at a constant current of 0.5 mA between 4 V and 2 V, and the capacity retentivity of the battery was measured every cycle (with the initial discharge capacity taken as 100%). Table 1 shows the results.

TABLE 1

| No. | oxide added to $V_2O_5$ | amount (*1) | capacity retentivity (%) 100th | 200th | 300th |
|---|---|---|---|---|---|
| 1 | — | 0 | 77 | 75 | 70 |
| 2 | $GeO_2$ | 0.1 | 79 | 77 | 76 |
| 3 | $SiO_2$ | 0.1 | 76 | 76 | 75 |
| 4 | $B_2O_3$ | 0.1 | 70 | 71 | 67 |
| 5 | $MoO_3$ | 0.1 | 78 | 78 | 76 |
| 6 | $WO_3$ | 0.1 | 75 | 76 | 73 |
| 7 | $Nb_2O_5$ | 0.1 | 73 | 74 | 72 |
| 8 | $TeO_2$ | 0.1 | 76 | 74 | 73 |
| 9 | $Bi_2O_3$ | 0.1 | 78 | 75 | 73 |
| 10 | $Cr_3O_8$ | 0.1 | 76 | 75 | 74 |
| 11 | $ZrO_2$ | 0.1 | 77 | 76 | 75 |
| 12 | $GeO_2 + MoO_3$ | 0.05 + 0.05 | 78 | 75 | 75 |
| 13 | $SiO_2 + WO_3$ | 0.05 + 0.05 | 76 | 76 | 74 |
| Com.Ex.1 | — | — | 67 | 50 | 16 |
| Com.Ex.2 | $GeO_2$ | 0.1 | 76 | 75 | (*2) |

(*1): The y value for the formula $(V_2O_5)x·(A)y·zH_2O$ when $x + y = 1$.
(*2): The test was discontinued after 223 cycles owing to short-circuiting due to dendrite.

EXAMPLE 2

Batteries were fabricated in the same manner as in Example 1 with the exception of varying the proportion of oxide to be admixed with $V_2O_5$ for the positive electrode and using a phosphazene polymer having an average molecular weight of about 1,500,000 and represented by the formula $[NP\{O(CH_2CH_2O)_7CH_2CH_2CFHCF_2SO_3Li\}_{0.41}\{O(CH_2CH_2O)_7CH_3\}_{1.59}]n$ and lithium-aluminum alloy for the negative electrode. However, the oxides of layer structure were dried at 200° C. for 5 hours. The batteries were subjected to charge-discharge cycles (constant current 0.5 mA) between 4 V and 2 V to measure the average amount of discharge during 100 cycles. Table 2 shows the results.

TABLE 2

| No. | oxide added to $V_2O_5$ | amount (*3) | average amount of discharge (*4) |
|---|---|---|---|
| 14 | — | 0 | 100 |
| 15 | $GeO_2$ | 0.05 | 102 |
| 16 | $GeO_2$ | 0.3 | 90 |
| 17 | $MoO_3$ | 0.1 | 105 |
| 18 | $MoO_3$ | 0.4 | 96 |
| 19 | $WO_3$ | 0.1 | 102 |
| 20 | $WO_3$ | 0.3 | 98 |
| Com.Ex.3 | $GeO_2$ | 0.6 | 35 |
| Com.Ex.4 | $MoO_3$ | 0.6 | 54 |
| Com.Ex.5 | $WO_3$ | 0.6 | 38 |

(*3): The y value for the formula $(V_2O_5)x·(A)y·zH_2O$ wherein $x + y = 1$, and z was 0.2 for all the oxides of layer structure.
(*4): Relative to the amount for No. 14 which was taken as 100.

EXAMPLE 3

Batteries were fabricated in the same manner as in Example 1 with the exception of using an oxide of layer structure represented by $(V_2O_5)_{0.9}·(MoO_3)_{0.1}·0.3H_2O$ for the positive electrode and the phosphazene polymer listed in Table 3. The batteries were checked for the capacity retentivity. Table 3 shows the results.

TABLE 3

| No. | phophazene polymer | | | Li content (%) | capacity retentivity | | |
|---|---|---|---|---|---|---|---|
| | (*5) h | k | average molecular weight | | 100th | 200th | 300th |
| 21 | 1 | 1 | 1,150,000 | 0.6 | 77 | 76 | 74 |
| 22 | 1 | 7 | 1,780,000 | 1.1 | 76 | 73 | 70 |
| 23 | 2 | 7 | 2,100,000 | 0.35 | 78 | 75 | 76 |
| 24 | 7 | 1 | 1,170,000 | 0.67 | 77 | 75 | 72 |
| 25 | 7 | 2 | 1,560,000 | 0.51 | 77 | 75 | 74 |
| 26 | 7 | 7 | 1,750,000 | 0.21 | 78 | 77 | 76 |
| 27 | 18 | 2 | 2,090,000 | 0.63 | 76 | 73 | 70 |
| 28 | 18 | 7 | 2,010,000 | 0.52 | 77 | 76 | 72 |

(*5): The average number of repeating alkyleneoxy units.

EXAMPLE 4

(1) Preparation of Positive Electrodes

A specified oxide was added to $V_2O_5$ in an amount of 10 mole % based on the latter, and the two oxides were fully comminuted and mixed together in a mortar and then melted in a platinum nozzle with heating. The melt was forced out onto a copper rotor rotating at a high speed and thereby quenched to obtain a ribbonlike amorphous product. Two oxides, when admixed with $V_2O_5$, were used in an amount of 5 mole % each. Amorphous products thus obtained with use of various oxides were used to prepare positive electrodes in the same manner as in Example 1.

(2) Preparation of Negative Electrodes

Pieces of stainless steel foil, measuring 5.5 cm × 9 cm and 20 μm in thickness, were each centrally clad with a piece of lithium foil weighing 40 mg for use as negative electrodes.

(3) Preparation of Electrolyte

A solution was prepared by dissolving in 189 g of THF 1 g of $LiClO_4$ and 10 g of a phosphazene polymer having an average molecular weight of about 260,000 and represented by the formula

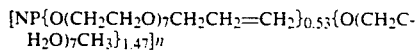

$$[NP\{O(CH_2CH_2O)_7CH_2CH=CH_2\}_{0.53}\{O(CH_2C-H_2O)_7CH_3\}_{1.47}]_n$$

and subjecting the solution to an ultrasonic treatment at a temperature of up to 40° C.

(4) Fabrication of Batteries

Sheet-type batteries were fabricated in the same manner as in Example 1. For the fabrication of each battery, the positive electrode was coated with the electrolyte, from which the THF was removed, and the coating was irradiated with ultraviolet rays to form a film. Subsequently, the electrode was affixed to the negative electrode having a sealant applied thereto over a width of about 5 mm along its periphery, as vacuum-sealed to complete the battery.

For comparison, a battery was prepared in Comparative Example 6 in the same manner as in Example 4 except that the positive electrode was a sheet prepared from a mixture of finely divided crystalline $V_2O_5$, conductive agent of acetylene black and forming agent of polytetrafluoroethylene in the ratio of 70:25:5.

Further a battery was prepared in Comparative Example 7 in the same manner as in Example 4 with the exception of using a nonwoven fabric of polypropylene impregnated with an electrolyte which was prepared by dissolving 1 mole/liter of $LiClO_4$ in a mixture of propylene carbonate and dimethoxyethane (1:1). The positive electrode was prepared using $V_2O_5$ and $GeO_2$ in combination as an oxide of layer structure.

(5) Measurement of Charge-Discharge Characteristics of Batteries

The batteries were subjected to charge-discharge cycles at a constant current of 0.5 mA between 4 V and 2 V and checked for the capacity retentivity every cycle (with the initial discharge capacity taken as 100%). Table 4 shows the results.

TABLE 4

| No. | oxide added to $V_2O_5$ | capacity retentivity (%) | | |
|---|---|---|---|---|
| | | 100th | 200th | 300th |
| 29 | $GeO_2$ | 78 | 77 | 75 |
| 30 | $SiO_2$ | 75 | 76 | 74 |
| 31 | $B_2O_3$ | 70 | 70 | 67 |
| 32 | $MoO_3$ | 78 | 79 | 76 |
| 33 | $WO_3$ | 76 | 77 | 74 |
| 34 | $Nb_2O_5$ | 75 | 74 | 72 |
| 35 | $TeO_2$ | 72 | 72 | 69 |
| 36 | $Bi_2O_3$ | 74 | 74 | 72 |
| 37 | $Cr_3O_8$ | 75 | 74 | 71 |
| 38 | $ZrO_2$ | 76 | 76 | 74 |
| 39 | $GeO_2 + MoO_3$ | 78 | 76 | 75 |
| 40 | $SiO_2 + WO_3$ | 77 | 75 | 73 |
| Com.Ex.6 | — | 66 | 51 | 16 |
| Com.Ex.7 | $GeO_2$ | 75 | 76 | (*6) |

(*6): The test was discontinued after 241 cycles owing to short-circuiting due to dendrite.

EXAMPLE 5

Batteries were fabricated in the same manner as in Example 4 with the exception of varying the proportion of the oxide to be admixed with $V_2O_5$ for the positive electrode and using a phosphazene polymer having an average molecular weight of about 320,000 and represented by the formula

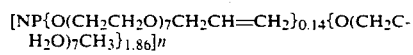

$$[NP\{O(CH_2CH_2O)_7CH_2CH=CH_2\}_{0.14}\{O(CH_2C-H_2O)_7CH_3\}_{1.86}]_n$$

and lithium-aluminum alloy for the negative electrode. However, the oxide of layer structure was dried at 200° C. for 3 hours. The batteries were subjected to charge-discharge cycles (constant current 0.5 mA) between 4 V and 2 V and checked for the average amount of discharge during 100 cycles. Table 5 shows the results.

TABLE 5

| No. | oxide added to $V_2O_5$ | amount to $V_2O_5$ (*7) | average amount of discharge (*8) |
|---|---|---|---|
| 41 | $GeO_2$ | 0.001 | 101 |
| 42 | $GeO_2$ | 0.3 | 90 |
| 43 | $MoO_3$ | 0.1 | 105 |
| 44 | $MoO_3$ | 0.4 | 96 |
| 45 | $WO_3$ | 0.05 | 102 |
| 46 | $WO_3$ | 0.2 | 98 |
| Com.Ex.8 | — | 0 | 100 |
| Com.Ex.9 | $GeO_2$ | 0.6 | 33 |
| Com.Ex.10 | $MoO_3$ | 0.6 | 52 |
| Com.Ex.11 | $WO_3$ | 0.6 | 30 |

(*7): The y value for the formula $(V_2O_5)_x \cdot (A)_y \cdot zH_2O$ wherein $x + y = 1$, and z was 0.2 for all the oxides of layer structure.
(*8): Relative to the amount obtained when the oxide of layer structure was composed of $V_2O_5$ only and taken as 100.

EXAMPLE 6

Batteries were fabricated in the same manner as in Example 4 with the exception of using a phosphazene polymer having an average molecular weight of about 80,000 and represented by the formula

[NP{O(CH$_2$CH$_2$O)$_7$CH$_2$CH=CH$_2$}$_{0.82}${O(CH$_2$C-H$_2$O)$_7$CH$_3$}$_{1.18}$]$_n$

These batteries were subjected to deep charge-discharge cycles at a constant current of 0.5 mA between 4 V and ½ V. and checked for the capacity retentivity (relative to the initial discharge capacity which was taken as 100%). The results are listed in Table 6, which also shows the result achieved by a battery wherein V$_2$O$_5$ was singly used as an oxide of layer structure (Comparative Example 12).

TABLE 6

| No. | oxide added to V$_2$O$_5$ | amount (*9) | capacity retentivity (%) | | |
|---|---|---|---|---|---|
| | | | 50th | 100th | 150th |
| 47 | GeO$_2$ | 0.001 | 71 | 67 | 63 |
| 48 | GeO$_2$ | 0.2 | 72 | 70 | 71 |
| 49 | SiO$_2$ | 0.001 | 73 | 70 | 66 |
| 50 | SiO$_2$ | 0.1 | 73 | 71 | 70 |
| 51 | MoO$_3$ | 0.003 | 72 | 68 | 65 |
| 52 | MoO$_3$ | 0.4 | 75 | 73 | 72 |
| Com.Ex.12 | — | 0 | 70 | 63 | 46 |

(*9): The y value for the formula (V$_2$O$_5$)$_x$ · (A)$_y$ · zH$_2$O wherein x – y = 1, and z was 0.3 for all the oxides of layer structure.

EXAMPLE 7

(1) Preparation of Positive Electrodes

Positive electrodes were prepared in the same manner as in Example 4.

(2) Preparation of Negative Electrodes

Pieces of stainless steel foil, measuring 5.5 cm×9 cm and 20 μm in thickness, were each centrally clad with 40 mg of lithium foil for use as negative electrodes.

(3) Preparation of Electrolyte

A solution was prepared by dissolving in 189 g of tetrahydrofuran (THF) 1 g of LiClO$_4$ and 10 g of a polymer having an average molecular weight of about 1,000,000 and represented by the formula

[NP{O(CH$_2$CH$_2$O)$_{7.0}$CH$_3$}$_2$]$_n$.

(4) Fabrication of Batteries

Sheet-type batteries were fabricated in the same manner as in Example 1. For the fabrication of each battery, the positive electrode was coated with the electrolyte, from which the THF was removed to form a film. Subsequently, the coated electrode was affixed to the negative electrode having a sealant applied thereto over a width of about 5 mm along its periphery, as vacuum-sealed to complete the battery.

(5) Measurement of Charge-Discharge Characteristics of Batteries

The batteries were subjected to charge-discharge cycles at a constant current of 0.5 mA between 4 V and 2 V and checked for the capacity retentivity every cycle (relative to the initial discharge capacity which was taken as 100%). Table 7 shows the results.

TABLE 7

| No. | oxide added to V$_2$O$_5$ | capacity retentivity (%) | | |
|---|---|---|---|---|
| | | 100th | 200th | 300th |
| 53 | GeO$_2$ | 77 | 78 | 75 |
| 54 | SiO$_2$ | 76 | 76 | 74 |
| 55 | B$_2$O$_3$ | 71 | 70 | 68 |
| 56 | MoO$_3$ | 79 | 78 | 76 |
| 57 | WO$_3$ | 77 | 76 | 75 |
| 58 | Nb$_2$O$_5$ | 74 | 75 | 72 |
| 59 | TeO$_2$ | 73 | 72 | 68 |
| 60 | Bi$_2$O$_3$ | 74 | 73 | 72 |
| 61 | Cr$_3$O$_8$ | 74 | 74 | 70 |
| 62 | ZrO$_2$ | 75 | 76 | 74 |
| 63 | GeO$_2$ + MoO$_3$ | 77 | 77 | 74 |
| 64 | SiO$_2$ + WO$_3$ | 77 | 74 | 73 |

EXAMPLE 8

Batteries were fabricated in the same manner as in Example 7 with the exception of varying the proportion of the oxide to be admixed with V$_2$O$_5$ to form an oxide of layer structure for the positive electrode and using an electrolyte polymer having an average molecular weight of about 210,000 and represented by the formula [NP{O(CH$_2$CH$_2$O)$_{5.2}$CH$_3$}$_2$]n and lithium-aluminum alloy for the negative electrode. However, the oxides of layer structure were dried at 200° C. for 3 hours. The batteries were subjected to charge-discharge cycles (constant current 0.5 mA) between 4 V and 2 V and checked for the average amount of discharge for 100 cycles. Table 8 shows the results.

TABLE 8

| No | oxide added to V$_2$O$_5$ | amount to V$_2$O$_5$ (*10) | average amount of discharge (*11) |
|---|---|---|---|
| 65 | GeO$_2$ | 0.001 | 100 |
| 66 | GeO$_2$ | 0.3 | 91 |
| 67 | MoO$_3$ | 0.1 | 105 |
| 68 | MoO$_3$ | 0.4 | 97 |
| 69 | WO$_3$ | 0.05 | 102 |
| 70 | WO$_3$ | 0.2 | 98 |
| Com.Ex.13 | — | 0 | 100 |
| Com.Ex.14 | GeO$_2$ | 0.6 | 31 |
| Com.Ex.15 | MoO$_3$ | 0.6 | 53 |
| Com.Ex.16 | WO$_3$ | 0.6 | 33 |

(*10): The y value for the formula (V$_2$O$_5$)$_x$ · (A)$_y$ · zH$_2$O wherein x – y = 1, and z was 0.2 for all the oxides of layer structure.
(*11): Relative to the amount obtained when the oxide of layer structure was composed of V$_2$O$_5$ only and taken as 100.

EXAMPLE 9

Batteries were fabricated in the same manner as in Example 7 with the exception of using a electrolyte polymer having an average molecular weight of about 2,000,000 and represented by the formula [NP{O(CH$_2$CH$_2$O)$_{7.0}$CH$_3$}$_2$]n. The batteries were subjected to deep charge-discharge cycles at a constant current of 0.5 mA between 4 V and ½ V and checked for the capacity retentivity (relative to the initial discharge capacity which was taken as 100%) every cycle. The results are given in Table 9, which also shows the result achieved by a battery wherein V$_2$O$_5$ was used singly as an oxide of layer structure (Comparative Example 17).

TABLE 9

| No. | oxide added to V$_2$O$_5$ | amount (*12) | capacity retentivity (%) | | |
|---|---|---|---|---|---|
| | | | 50th | 100th | 150th |
| 71 | GeO$_2$ | 0.001 | 70 | 67 | 64 |
| 72 | GeO$_2$ | 0.2 | 72 | 71 | 70 |
| 73 | SiO$_2$ | 0.001 | 73 | 71 | 65 |

TABLE 9-continued

| No. | oxide added to $V_2O_5$ | amount (*12) | capacity retentivity (%) | | |
|---|---|---|---|---|---|
| | | | 50th | 100th | 150th |
| 74 | $SiO_2$ | 0.1 | 73 | 70 | 70 |
| 75 | $MoO_3$ | 0.003 | 72 | 69 | 65 |
| 76 | $MoO_3$ | 0.4 | 75 | 73 | 71 |
| Com.Ex.17 | — | 0 | 70 | 64 | 45 |

(*12): The y value for the formula $(V_2O_5)x \cdot (A)y \cdot zH_2O$ wherein $x+y=1$, and z was 0.3 for all the oxides of layer structure.

EXAMPLE 10

Batteries were fabricated in the same manner as in Example 7 with the exception of using an oxide of layer structure represented by the formula $(V_2O_5)_{0.95}\text{-}(GeO_2)_{0.05}\cdot 0.3H_2O$ for the positive electrode and further using the electrolyte polymers listed in Table 10. The batteries were subjected to charge-discharge cycles at a constant current of 0.5 mA between 4 V and 2 V and checked for the average amount of discharge for 100 cycles. Table 10 shows the results. The polymers used were about 1,000,000 in average molecular weight.

TABLE 10

| No. | m (*13) | average amount of discharge (*14) |
|---|---|---|
| 77 | 2.1 | 48 |
| 78 | 5.2 | 94 |
| 79 | 7.0 | 100 |
| 80 | 11.8 | 95 |
| 81 | 15.3 | 68 |
| Com.Ex.18 | 26.7 | 13 |

(*13): The average number of repeating ethyleneoxy units of the polymer.
(*14): Relative to the amount, taken as 100, for the polymer wherein m = 7.0.

INDUSTRIAL APPLICATION

The invention provides a useful all solidstate secondary battery which is substantially free of spillage and formation of dendrite, has no iginitability because of the features of flame retardancy and low vapor pressure, is excellent in safety against explosion, repture or the like and also in resistance to excessive discharging and has a prolonged charge-discharge cycle life.

We claim:

1. An all solidstate secondary battery comprising an oxide of a layered structure represented by a formula $(V_2O_5)x\cdot(A)y\cdot zH_2O$ wherein $x+y=1$, $0<y\leq 0.5$, z is 0.1 to 1.6, and A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$, the oxide of the formula serving as a cathode active material, lithium or a lithium alloy serving as an anode active material, and at least one of the substances (a) to (c) given below serving as an electrolyte:

(a) Oligalkyleneoxypolyphosphazenes having a fluoroalkylsulfone group comprising segments of the following formalae (I), (II) and (III) in an optional arrangement,

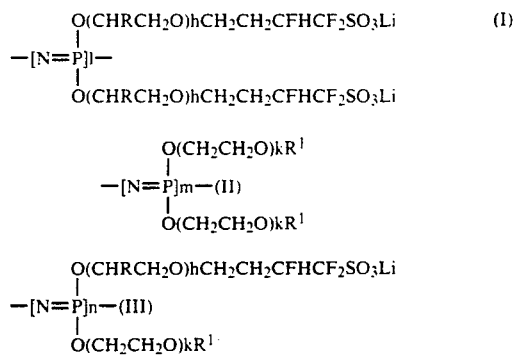

wherein R is hydrogen or methyl, $R^1$ is methyl, ethyl or propyl, h and k each represent the average number of repeating alkyleneoxy units and are a real value in the respective ranges of $0\leq h\leq 18$ and $0\leq k\leq 20$, m and n are each an integer and are in the range of $3\leq l+m+n\leq 200000$, and $1+n\neq 0$;

(b) Complex compounds of a lithium salt and an oligoalkyleneoxypolyphosphazene having allyl groups and comprising segments of the following formulae (IV), (V) and (VI) in an optional arrangement

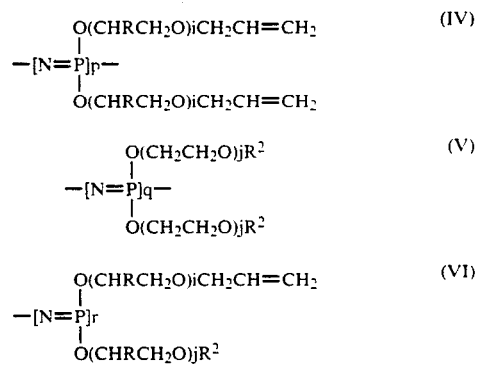

wherein R is hydrogen or methyl, $R^2$ is one or a mixture of at least two of methyl, ethyl and propyl, i and j each represent the average number of repeating alkyleneoxy units and are a real value in the respective ranges of $0\leq i\leq 15$ and $0\leq j\leq 15$, p, q and r are 0 or a positive integer provided that $3\leq p+q+r\leq 200000$, and $r\neq 0$;

(c) Solutions of a lithium salt in a polymer represented by the following formula (VII)

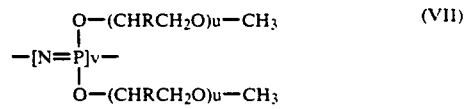

wherein R is hydrogen or methyl, u represents the average number of repeating alkyleneoxy units and is a real value of 1 to 20, and represents the average number of repetitions and is a real value in the range of $3\leq v\leq 200000$.

* * * * *